United States Patent [19]

Suzuki

[11] Patent Number: 5,040,901
[45] Date of Patent: Aug. 20, 1991

[54] TEMPERATURE MEASURING DEVICE

[75] Inventor: Seigo Suzuki, Fujinomiya, Japan

[73] Assignee: Terumo Kabushiki Kaisha, Tokyo, Japan

[21] Appl. No.: 425,198

[22] PCT Filed: Apr. 8, 1988

[86] PCT No.: PCT/JP88/00360

§ 371 Date: Nov. 3, 1989

§ 102(e) Date: Nov. 3, 1989

[87] PCT Pub. No.: WO88/08122

PCT Pub. Date: Oct. 20, 1988

[30] Foreign Application Priority Data

Apr. 9, 1987 [JP] Japan .................................. 62-87732

[51] Int. Cl.$^5$ ............................. G01K 1/14; G01K 7/22
[52] U.S. Cl. .................................. 374/183; 73/204.25;
128/736; 374/136; 374/165
[58] Field of Search ............... 374/147, 165, 183, 185,
374/136; 73/204.25, 295; 128/736

[56] References Cited

U.S. PATENT DOCUMENTS

| | | | |
|---|---|---|---|
| 4,129,848 | 12/1978 | Frank et al. | 374/185 X |
| 4,319,483 | 3/1982 | Durham, Jr. et al. | 73/204.25 X |
| 4,795,884 | 1/1989 | Carroll | 374/183 X |
| 4,802,489 | 2/1989 | Nitzan | 128/736 |
| 4,854,731 | 8/1989 | Jenkins | 374/183 X |
| 4,886,371 | 12/1989 | Fondin | 374/165 X |

FOREIGN PATENT DOCUMENTS

| | | | |
|---|---|---|---|
| 4848679 | 10/1946 | Japan . | |
| 55-112231 | 8/1980 | Japan . | |
| 58-89835 | 6/1983 | Japan . | |
| 60-17430 | 2/1985 | Japan . | |
| 62-48711 | 11/1987 | Japan | 73/204.25 |

Primary Examiner—Daniel M. Yasich
Attorney, Agent, or Firm—Frishauf, Holtz, Goodman & Woodward

[57] ABSTRACT

A temperature measuring device includes a metallic heating member, a temperature sensor such as a thermistor, and an electrical insulating thin film formed on the inner surface of the heating member, the temperature sensor being fixedly mounted on the inner closed-end surface of the heating member, the outer closed-end surface of which faces an object to be measured. The arrangement enables blood temperature to be highly accurately and effectively measured without the need of deeply inserting the heating member into the blood flow passageway and without being influenced by undesirable ambient temperature because the temperature sensor is enclosed by the heating member have a closed-end cylindrical construction. Furthermore, the arrangement can prevent extraneous voltage from being applied on the blood through the use of the electrical insulating film. The temperature measuring device according to the present invention is preferably used for measuring the temperature of blood in extracorporeal circulation for use in an artificial heart-lung machine, etc.

15 Claims, 4 Drawing Sheets

TEMPERATURE MEASURING DEVICE

TECHNICAL FIELD

The present invention relates to a temperature measuring device, and more specifically to a device that is capable of detecting with utmost effectiveness the temperature of an object to be measured, of completely preventing the object from becoming electrically conductive with the device through an electrically insulating film, and of assuring temperature detection suitable for measuring temperature of a blood flow in medical fields for example, by providing a metallic heating member of a closed-end cylindrical construction which has its outer surface facing the object to be measured, and further having an inner surface on which the electrical insulating film is fixedly mounted, and having a fixedly mounted temperature sensor on the inner surface.

BACKGROUND OF THE INVENTION

Varieties of temperature measuring devices have generally been available in various different industrial fields to detect temperatures of objects to be measured such as fluids or solids.

In a medical field for example, various types of temperature controls are carried out utilizing hypothermic methods and normal temperature circulation methods, etc., in extracorporeal circulation with use of an artificial heart-lung machine etc., and in that case blood temperature in the extracorporeal circulation has been measured by temperature measuring devices of all sorts.

FIGS. 1 and 2 illustrate such prior temperature measuring devices.

As illustrated in FIG. 1, a prior temperature measuring device 2 mainly includes a synthetic resin cylindrical member 4, a closed-end tube 6 attached fixedly to the cylindrical member 4 in a liquid tight manner at its end on its opening side, and a temperature sensor 8 detachably mounted interiorly of the closed-end tube 6. The cylindrical member 4 is bonded to a housing 10 such as a casing of an artificial heart-lung machine, and the closed-end tube 6 allows its closed-end part to enter the housing 10, i.e., the blood passageway 12, to a predetermined depth.

In such configuration, the closed-end tube 6 protruding into the blood passageway 12 defined in the housing 10 informs the temperature sensor 8 of the temperature of blood flowing in the blood passageway 12, for measurement of the same through the temperature sensor 8.

In the prior temperature measuring device, however, the closed-end tube 6, which protrudes deeply into the blood passageway 12, perturbs the blood flow in the vicinity thereof to produce hemagglutination there around and damage blood cells.

Further, as illustrated in FIG. 2, a temperature measuring device of another type includes a body 18, to both ends of which circulation lines 16, 16 are connectable, a blood flow passageway 22 defined interiorly of the body 18, and a temperature sensor 20 facing the blood flow passageway 22.

Thus, the prior temperature measuring device 14 of the second example also has a drawback in the same manner as in the first example shown in FIG. 1 in that the temperature sensor 20 tends to perturb the blood flow in the blood flow passageway 22 and damage blood cells flowing in the passageway 22.

To solve the above drawback, it might be considered that the depth of the insertion of the temperature sensor 20 into the blood flow passageway 22 should be made as small as possible. This however produces a severe influence of ambient temperature on the temperature sensor 20, impeding an accurate measurement of the blood temperature by the temperature sensor 20.

Additionally, those prior temperature measuring devices 2, 14 have no insulating means, thus causing an extraneous voltage to be applied on blood flowing through the blood flow passageways 12, 22.

DISCLOSURE OF THE INVENTION

In view of the drawbacks with the prior temperature measuring devices, it is an object of the present invention to provide a temperature measuring device which is capable of measuring a blood temperature with high accuracy one the one hand, and is capable of preventing extraneous voltage from being applied on blood. The object of the invention is accomplished by providing a metallic heating member, which is substantially a closed-end cylindrical construction U-shaped in cross-section and having a substantially cylindrical closed end and which is a good heat conductor, providing an electrical insulating thin film on the inner surface of the metallic heating member, and further providing a temperature sensor such as a thermistor fixedly mounted through the electrical insulating thin film on a predetermined area of one surface of the metallic heating member, the other surface of which makes contact with an object to be measured such as blood, thereby eliminating the need for inserting the metallic heating member into the blood flow passageway and avoiding the influence of undesirable ambient temperature on the temperature sensor when measuring blood temperature by allowing the metallic heating member to enclose the temperature sensor.

To achieve the above objects, a temperature measuring device in accordance with one aspect of the present invention for detecting the temperature of blood flowing in a predetermined direction in a blood flow passageway includes a metallic heating member that is a closed-end cylindrical construction, an electrical insulating film formed on the inner closed-end surface of the closed-end cylindrical construction, a temperature sensor fixedly mounted on the electrical insulating film, the cylindrical construction having its outer closed-end surface being located substantially on the same plane as an inner wall surface of the heating member for defining the blood flow passageway for the purpose of preventing turbulent flow from being produced in the blood flow in the blood flow passageway.

In accordance with another aspect of the present invention, the closed-end cylindrical construction includes a detecting surface part formed on the closed-end thereof, the electrical insulating film formed on the inner peripheral surface of the cylindrical construction and on the inside surface of the detecting surface part, the outside surface of which faces the blood flow passageway, and the temperature sensor fixedly mounted on the inside surface of the detecting surface part, the area of the detecting surface part being selected to be four times or more greater than the area of a junction of the temperature sensor.

In accordance with further another aspect of the present invention, the heating member is mounted on the holder, and the temperature sensor is detachably mounted on an extracorporeal blood circulation circuit construction, which defines the blood flow passageway, through a threaded part formed in the holder.

In accordance with still another aspect of the present invention, the holder comprises a heat insulating material.

In accordance with yet still another aspect of the present invention, the temperature sensor is fixedly mounted on the heating member through epoxy resin.

In accordance with further another aspect of the present invention, the electrical insulating film is formed by vapor deposition on the heating member.

In accordance with yet still another aspect of the present invention, the electrical insulating film is formed by baking on the heating member.

BEST MODE FOR CARRYING OUT THE INVENTION

In the following, preferred embodiments of a temperature measuring device according to the present invention will be described with reference to the accompanying drawings.

Figure 1:
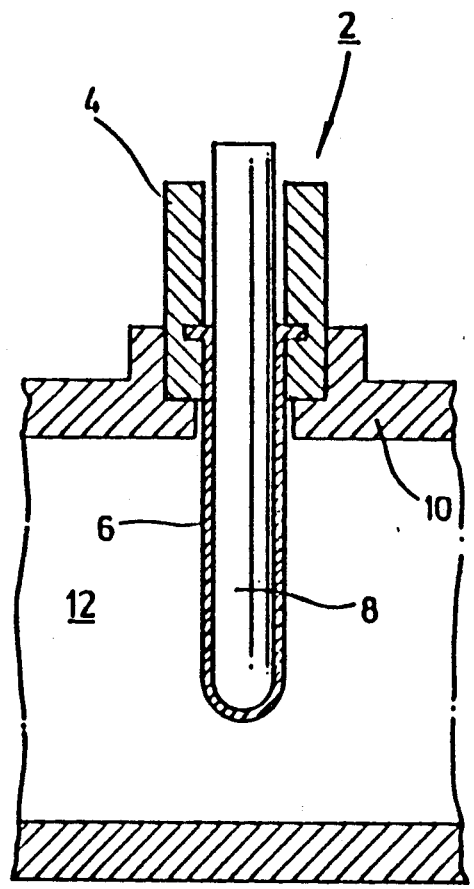
FIGS. 1 and 2 are schematic cross-sectional views each illustrating a prior temperature measuring device.
Figure 2:
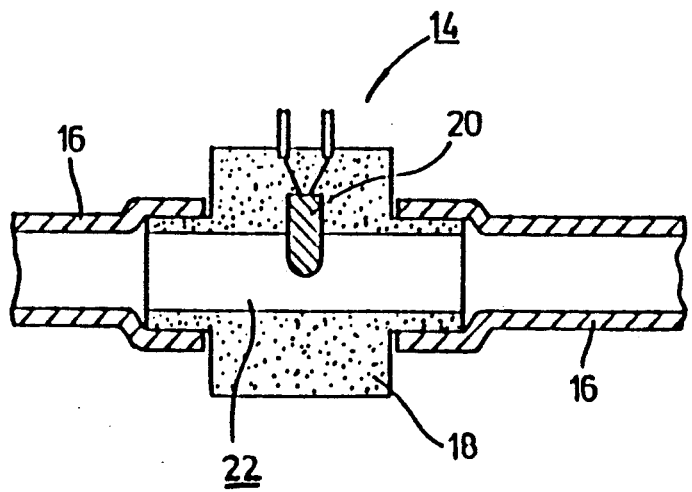
Figure 3:
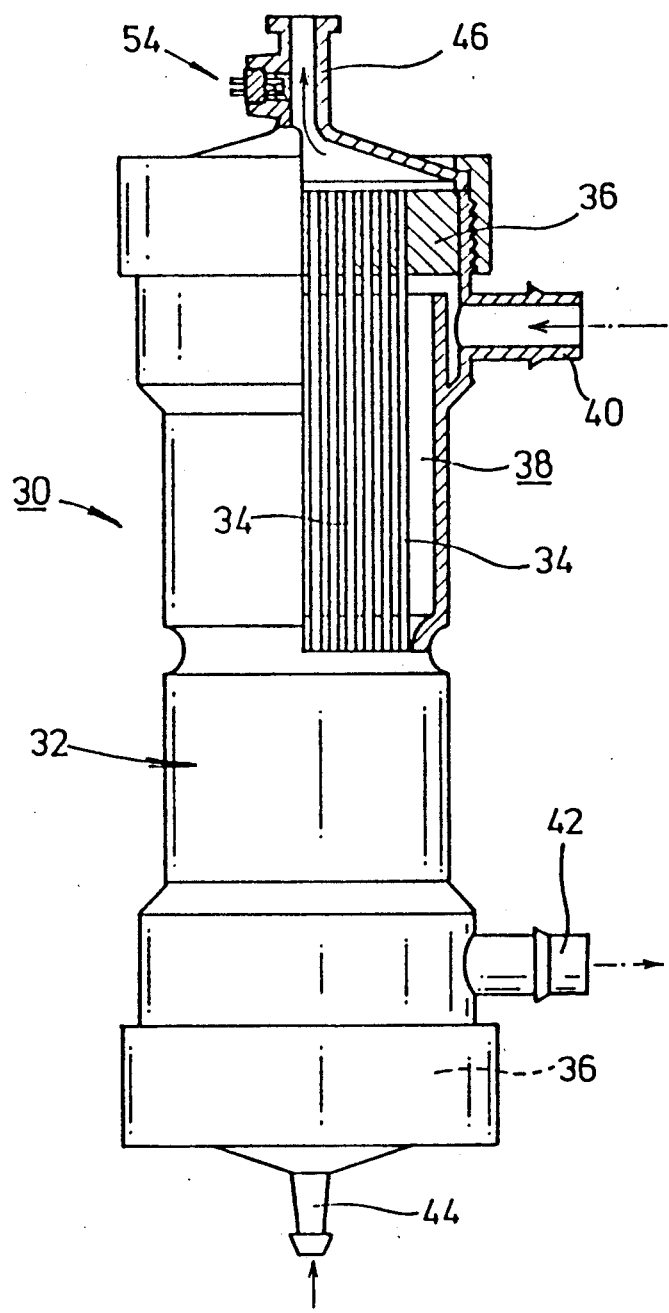
FIG. 3 is a frontal view cut away in part illustrating a hollow fiber type artificial heart-lung machine which incorporates a temperature measuring device according to the present invention.

Referring to FIG. 3, a hollow fiber type artificial heart-lung machine designated at 30 is illustrated, which incorporates therein a temperature measuring device 40 according to the present invention. The hollow fiber type artificial heart-lung machine 30 includes a substantially cylindrical housing 32, which housing in turn includes a plurality of hollow fiber diaphragms 34 laid therein vertically. The hollow fiber diaphragm 34 is supported in the housing 32 in a liquid tight manner through partitions 36, 36 provided at both ends of the housing 32, and a gas chamber 38 is defined by the partitions 36, 36, an inner wall of the housing 32, and an outer wall of the hollow fiber diaphragm 34. The gas chamber 38 communicates with a gas inlet port 40 and a gas outlet port 42 provided on the sides of the housing 32.

Figure 4:
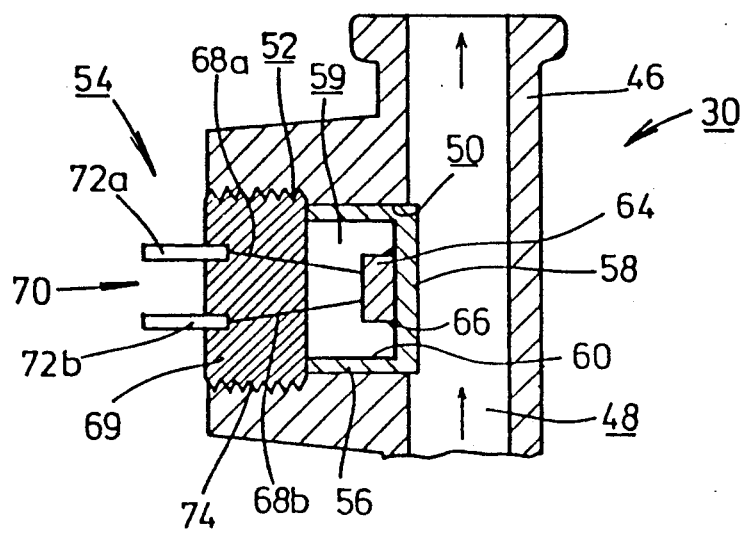
FIG. 4 is a cross-sectional view illustrating the temperature measuring device according to the present invention.

Additionally, the housing 32 includes at both ends thereof blood inlet and outlet ports 44, 46, both protruding outwardly of the housing 32. The blood outlet port 46, which protrudes upwardly of the housing 32 as illustrated in FIG. 3, includes a blood flow passageway 48 defined therein. A hole portion 50 formed through the blood outlet port 46 communicates with the blood flow passageway 48, as illustrated in FIG. 4. The hole portion 50 has a threaded groove 52 formed therein at its end, and a temperature measuring device 54 according to the present invention is detachably mounted on the blood outlet port 46 through the hole portion 50 and the threaded groove 52.

The temperature measuring device 54 includes a heating member 56 which is made of metal such as titanium, stainless steel having excellent heat conductivity. The heating member 56 is of a substantially closed-end cylindrical construction including a disk-shaped detecting surface part 58 at one end thereof, and defines a chamber 59 therein. The heating member 56 is to fit into the hole portion 50 in the blood outlet port 46, and the detecting surface part 58 has its area selected to be sufficiently larger than that of a thermistor (described later) fixedly mounted thereon. To assure highly accurate temperature measurement by the thermistor without suffering the detriment of ambient temperature change on the measurement, the area of the detecting surface part 58 may be about four times larger than that of the thermistor. This is because the conduction of the local temperature change is averaged.

In succession, an electrical insulating film 60 is deposited by vapor deposition on the inner peripheral surface of the heating member 56 and on the inside surface of the detecting surface part 58. The electrical insulating film 60 comprises a material such as $SiO_2$, alumina, polytetra fluoroethylene or $SiN_3$, and has a thickness from 1 $\mu$m to 20 $\mu$m, preferably from 4 $\mu$m to 10 $\mu$m.

The thermistor 64 is fixedly mounted through an epoxy resin filling material 66 in the chamber 59 of the heating member 56, substantially on the inside surface of the detecting surface part 58, on which the insulating film 60 has been formed. Lead wires 68a, 68b are electrically connected at one end thereof to the thermistor 64 and at the other ends thereof to pins 72a, 72b of a connector 70 attached to the holder 69. The holder 69, which comprises a heat insulating material such as vinyl chloride and urethane on the like, includes one end fixedly mounted on the heating member 56, and its outer periphery is threaded into the thread groove 52 formed in the blood outlet port 46 using threaded part 74. It should here be noted that the heating member 56 is fitted into the hole portion 50 formed in the blood outlet port 46, and the threaded part 74 of the holder 69 is threaded into the thread groove 52, for mounting the temperature measuring device 54 on the blood outlet port 46 such that the detecting surface part 58 is substantially coplanar with respect to a peripheral wall surface which defines the blood passageway 48. It should further be noted that the detecting surface part 58 may be inserted into the blood flow passageway 48 by approximately 1 mm, in practice, from the peripheral surface wall defining the blood flow passageway 48.

In the following operation and effect of the temperature measuring device of the present invention arranged basically as described above will be described.

To start the temperature measurement of the blood flowing through the extracorporeal circuit (not shown), the hollow fiber type artificial heart-lung machine 30 is assembled into the circuit. The blood, flowing into the housing 32 through the blood inlet port 44, passes through a plurality of the hollow fiber diaphragms 34 and is ejected from the blood flow passageway 48 through the blood outlet port 46 to a heat exchanger for example. Here, gas is introduced from the gas inlet port 40 into the gas chamber 38 connected to the former, whereby the gas is brought into contact with the blood for gas exchange.

The blood flowing through the blood flow passageway 48 makes contact with the outside of the detecting surface part 58 of the heating member 56 which constitutes the temperature measuring device 54 mounted on the blood outlet port 46. The temperature of the blood, which makes contact with the detecting surface part 58, is transmitted to the thermistor 64 and supplied as a temperature signal to a measuring device (not shown) through the connector 70 connected to the lead wires 68a, 68b, for the purpose of measurement of the blood temperature.

In the above described situation, there is, in accordance with the present embodiment, provided a very thin insulating film 60, being provided only between the heating member 56 and the thermistor 64. This prevents any voltage from being applied on the blood and allows the blood temperature to be effectively transmitted from the heating member 56 to the thermistor 64. Since the area of the detecting surface part 58, which is in contact with the thermistor 58 through the insulating film 60, has thereupon been selected to be four times or more that of the thermistor 64, an averaged temperature rather than a local one is transmitted to the thermistor 64. In addition, the heating member 56 has a closed-end constructed, being substantially U-shaped in ross section, and including the thermistor 64 fixed in the chamber 59 defined by the heating member 56 and the holder 69, the holder being fixedly mounted on the end thereof to enclose the chamber 59, and wherein the holder has excellent properties of heat insulation. Accordingly, any undesired external temperature is insulated from the interior of the chamber 59 and only the blood temperature is transmitted to the thermistor 64 through the detecting surface part 58 of the heating member 56, thus assuring the achievement of a highly accurate blood temperature measurement in a short time.

Furthermore, the temperature measuring device 54 has included thereon a detecting surface part 58 having a relatively large area formed on the heating member 56, which detecting surface part is disposed to be substantially coplanar with respect to the internal peripheral surface of the heating member defining the blood flow passageway 48 of the blood outlet port 46. Accordingly, the blood flowing through the blood flow passageway 48 is not subjected to turbulence which might otherwise have been caused by the heating member 56 and hence prevents hemagglutination from being formed and the blood cells from being damaged, thus assuring an effective blood temperature measurement.

Moreover, the temperature measuring device 54 is detachably mounted on the blood outlet port 46 through the threaded part 74 formed in the outer peripheral surface of the holder 69. It is therefore possible to mount the temperature measuring device 54 with ease on various apparatuses, thus advantageously presenting general-purpose temperature measuring device.

It should be noticed here that although in the present embodiment the electrical insulating film 60 was formed on the heating member 56 by vapor deposition of a material such as SiO$_2$ and alumina, etc., it may also be formed by other means such as baking for example. For example, such baking may be realized by first cleaning the heating member 56 to remove any components adhering surfaces to be rendered to baking (i.e., the internal peripheral surface of the heating member 56 and the inside surface of the detecting surface part 58). Such surfaces of the heating member 56 are then rendered to blasting to again clean the heating member 56. A coating material such as polyethylene telephthalate is sprayed on the surfaces to be baked and then an electrical insulating film is formed on such surfaces by baking. Here, the thickness of the baked electrical insulating film is selected to be the same as that of the electrical insulating film 60 described previously. In succession, the thermistor 64 may be fixedly mounted on the electrical insulating film formed as such through an epoxy resin. It is easily understood that the electrical insulating film formed by baking can manifest the same effect as the electrical insulating film 60 formed by vapor deposition.

Figure 5:
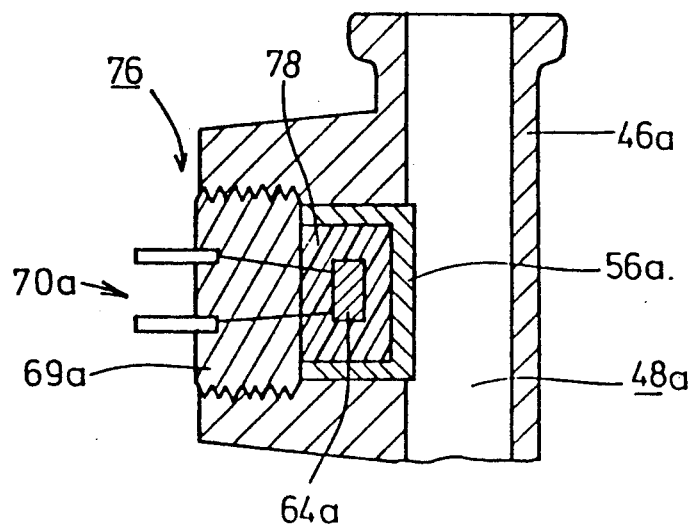
FIG. 5 is a schematic cross-sectional view illustrating another temperature measuring device.

The present inventors have experimentally detected the time intervals required for the temperature measurements of blood by the present temperature measuring device 54 and another temperature measuring device 76 shown in FIG. 5. In the following description, the temperature measuring device 76, which is constructed substantially in the same manner as the temperature measuring device 54 described previously in relation to FIG. 5, like reference numbers but with a small alphabetical letter "a" shall be applied to the like constituent elements and further description shall be omitted.

It is easily understood from FIG. 5 that in the temperature measuring device 76 the heating member 56a is filled with a filling material 78 of epoxy resin, which material electrically insulates the thermistor 64a from the heating member 56a and also holds the thermistor 64a therein.

In the aforementioned experiment, the temperature measuring devices 54, 76 were mounted on a connector (not shown), to both ends of which were connected a pipe line having an inner diameter of 9,575 mm. The pipe line was then supplied with tap water having a flow rate of 2 l/min. at 37° C. Table 1 lists the time intervals required by the respective measuring devices 54, 76 until the temperature reached a desired temperature to be measured.

TABLE 1

| Temperature Measuring Devices | Temperatures to be Measured | Time Intervals |
| --- | --- | --- |
| 54 | 37° C. | 4~6 sec. |
| 76 | 37° C. | 7~8 sec. |

It is obvious from Table 1 that the temperature measuring device 54, which has the thermistor 64 fixedly mounted on the detecting surface part 58 of the heating member 56 through the thin film electrical insulating film 60, achieves the advantage of more rapidly measuring temperature with the aid of the thermistor 64.

Figure 6:
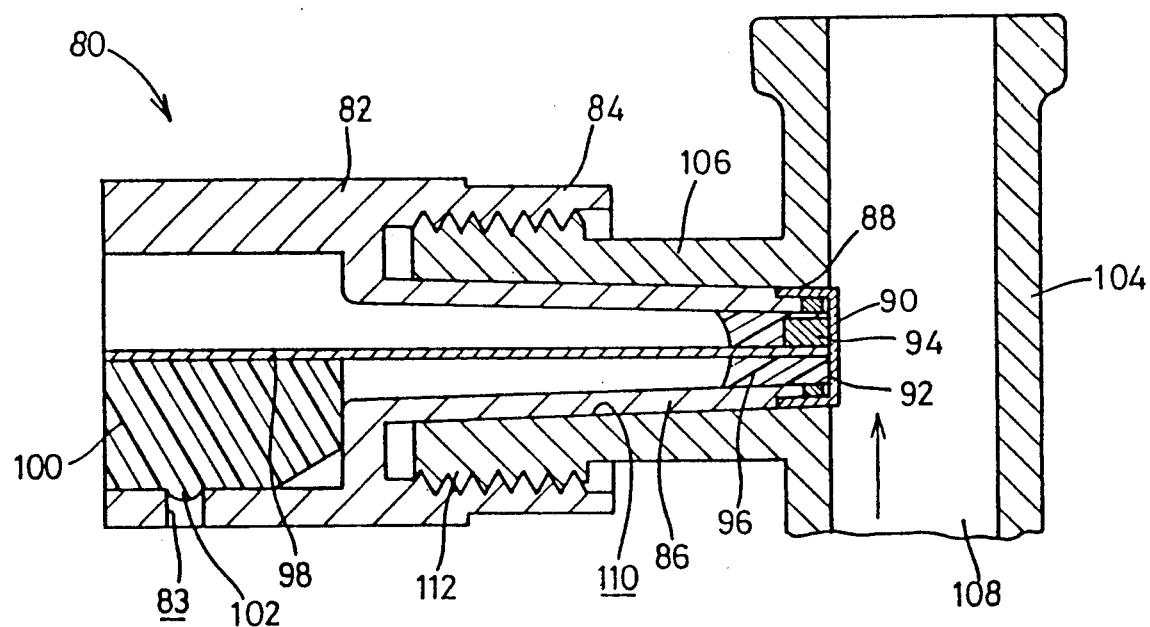
FIG. 6 is a cross-sectional view illustrating a temperature measuring device associated with another embodiment.

Referring now to FIG. 6, another embodiment of the temperature measuring device of the present invention is illustrated. As illustrated in the figure, the temperature measuring device 80 in accordance with this embodiment, includes a substantially cylindrical holder body 82 made of polycarbonate for example, which body includes a plurality of holes 83 formed through one end at an outer peripheral part thereof. In the other end of the body 82 a nut part 84 is formed integrally, which includes a threaded groove formed in an inner peripheral surface part thereof, and a long hollow taper 86 extends coaxially with the nut part 84, tapering in its size toward the right direction shown in the figure A. heating member 88, U-shaped in cross section, is fixedly mounted on the end of the taper 86.

The heating member 88 includes a disk-shaped detecting surface part 90 disposed on one end thereof, and further includes an electrical insulating film 92 formed on the inside surface of the detecting surface part 90 and on the inner peripheral surface of the heating member 88. The electrical insulating film 92 is constructed in the same manner as in the insulating film 60 described previously, and the description will be omitted here.

Additionally, a thermistor 94 is fixedly mounted on the inside surface of the detecting surface part 90, which has the insulating film 92 incorporated thereon, through a filling material 96, to which thermistor one end of a substrate 98 is connected. The substrate 98 extends through the taper 86 and the body 82, wherein a resilient holding member 100 is fixedly mounted on the other end side of the substrate. The holding member 100 is pressed into the body 82 to hold the substrate 98. One end of the holding member 100 includes a semi-spherical stopper part 102, which is fitted into the holes 83 formed through the body 82, whereby the holding member 100 is fixed on the body 82.

A hollow fiber type artificial heart-lung machine, incorporating the present embodiment of the temperature measuring device 80, includes a connecting part 106 protruding outwardly therefrom and formed integrally on one side of a blood outlet port 104. The connecting part 106 includes at the center thereof a hole portion 110 communicating with a blood flow passageway 108 of the blood outlet port 104, and further includes a threaded part 112 at the end thereof.

In such a configuration, the taper 86 of the temperature measuring device 80 is fitted into the hole portion 110 of the connecting part 106, and the nut part 84 is threaded into the threaded part 112. The smaller end part of the taper 86 is pressed into the hole part 110 and engaged with the latter so that the temperature measuring device 80 is mounted on the connecting part 106. The detecting surface part 90 of the heating member 88 is thus fixedly mounted on the tip end of the taper 86 and is slightly inserted into the blood flow passageway 108.

The temperature measuring device 80 includes a closed-end heating member 88 substantially U-shaped in cross section. Thin insulating films 92 are provided on the inner peripheral surface of the heating member 88 and on the inside surface of the detecting surface part 90, and further the thermistor 94 is fixedly mounted on the detecting surface part 90 through the insulating film 92. Thus, the same operation and effects as those of the aforementioned measuring device 54 can be assured.

INDUSTRIAL APPLICABILITY

In accordance with the present invention, as described above, an electrical insulating thin film is formed on one surface of the metallic heating member, the other surface of which makes contact with an object to be measured, and a temperature sensor such as a thermistor is fixedly mounted on the insulating film. Hereby, the temperature of the object is transmitted at once to the temperature sensor through the heating member thus assuring very rapid temperature measurement.

Additionally, the temperature sensor is housed in a heating member having a U-shaped in cross section such that only the temperature of the object is transmitted to the temperature sensor, thus assuring a highly effective and accurate temperature measurement for objects of all sorts. Moreover, the temperature sensor and the heating member are completely electrically insulated from each other, thus preventing any voltage from being applied on the object. Furthermore, the present temperature measuring device has been constructed to be detachable with ease on various apparatuses. Thus, the present invention presents a general-purpose temperature measuring device.

Although certain preferred embodiments have been shown and described, it should be understood that many changes and modifications may be made therein without departing from the scope of the appended claims. For example, the present invention may be applicable to temperature measurements in medical and other various fields.

What is claimed is:

1. A temperature measuring device for detecting the temperature of blood flowing in a blood flow passageway having an inner wall surface in a predetermined direction, comprising:
   (a) a metallic heat conducting member being of a closed-end cylindrical construction and having an outer closed-end surface;
   (b) an electrical insulating film formed at least on an inner closed-end surface of the metallic heat conducting member opposite said outer closed-end surface;
   (c) a temperature sensor fixedly mounted on said electrical insulating film;
   (d) said inner wall surface, which defines the blood flow passageway, being substantially coplanar with the outer closed-end surface of the cylindrical construction.

2. A temperature measuring device according to claim 1, wherein said cylindrical construction includes a detecting surface part formed on the closed-end thereof, the electrical insulating film is formed on the inner peripheral surface of the cylindrical construction and on the inside surface of the detecting surface part, the outside surface of which faces the blood flow passageway, and the temperature sensor is fixedly mounted on the inside surface of the detecting surface part, the area of the detecting surface part being selected to be four times or more greater than that of a junction between said temperature sensor and said insulating film.

3. A temperature measuring device according to claim 2 wherein said temperature sensor is fixedly mounted on the heat conducting member through epoxy resin.

4. A temperature measuring device according to claim 2 wherein said electrical insulating film is formed by vapor deposition on the heat conducting member.

5. A temperature measuring device according to claim 2 wherein said electrical insulating film is formed by baking onto the heat conducting member.

6. A temperature measuring device according to claim 2 wherein said temperature sensor is a thermistor.

7. A temperature measuring device according to claim 1 or 2 wherein said heat conducting member includes a holder, and said temperature sensor is detachably mounted on an extracorporeal blood circulation circuit construction part which defines the blood flow passageway through a threaded part formed in the holder.

8. A temperature measuring device according to claim 7 wherein said temperature senor is a thermistor.

9. A temperature measuring device according to claim 7 wherein said holder comprises a heat insulating material.

10. A temperature measuring device according to claim 9 wherein said temperature sensor is a thermistor.

11. A temperature measuring device according to claim 1 wherein said temperature sensor is fixedly mounted on the heat conducting member through epoxy resin.

12. A temperature measuring device according to claim 11 wherein said temperature sensor is a thermistor.

13. A temperature measuring device according to claim 1 wherein said electrical insulating film is formed by vapor deposition on the heat conducting member.

14. A temperature measuring device according to claim 1 wherein said electrical insulating film is formed by baking on the conducting member.

15. A temperature measuring device according to claim 1 wherein the temperature sensor is a thermistor.

* * * * *